US012793871B2

(12) United States Patent
Dukes

(10) Patent No.: US 12,793,871 B2
(45) Date of Patent: Nov. 10, 2026

(54) ARMORED CABLES WITH REDUCED PULLING FORCE

(71) Applicant: Southwire Company, LLC, Carrollton, GA (US)

(72) Inventor: Aaron Seth Dukes, Carrollton, GA (US)

(73) Assignee: Southwire Company, LLC, Carrollton, GA (US)

( * ) Notice: Subject to any disclaimer, the term of this patent is extended or adjusted under 35 U.S.C. 154(b) by 151 days.

(21) Appl. No.: 18/593,020

(22) Filed: Mar. 1, 2024

(65) Prior Publication Data

US 2024/0296973 A1 Sep. 5, 2024

Related U.S. Application Data

(60) Provisional application No. 63/502,800, filed on May 17, 2023, provisional application No. 63/488,311, filed on Mar. 3, 2023.

(51) Int. Cl.
*H01B 7/18* (2006.01)
*H01B 7/22* (2006.01)

(52) U.S. Cl.
CPC ............ *H01B 7/184* (2013.01); *H01B 7/226* (2013.01)

(58) Field of Classification Search
CPC . H01B 7/02; H01B 7/04; H01B 7/046; H01B 7/17; H01B 7/18; H01B 7/184; H01B 7/20; H01B 7/22; H01B 7/226; H01B 7/36; H01B 7/365; H01B 7/366; H01B 9/02; H01B 9/025; H01B 9/028; H01B 9/006
USPC .......................... 174/102 R–109, 110 R–112
See application file for complete search history.

(56) References Cited

U.S. PATENT DOCUMENTS 1,134,119 A * 4/1915 Gilson .................. H01B 7/226 138/131
1,215,365 A * 2/1917 Gilson .................. H01B 7/226 138/131
1,819,175 A 8/1931 James
1,908,063 A 5/1933 Schneider
2,018,939 A 10/1935 Wertzheiser et al.
2,086,152 A * 7/1937 Bedell .................. H01B 7/226 174/109
2,486,387 A 11/1949 Bringolf
2,870,792 A * 1/1959 Penrose .................. H01B 7/20 138/121
5,259,418 A 11/1993 Hamrick
5,350,885 A 9/1994 Falciglia et al.
5,468,914 A 11/1995 Falciglia et al.
RE38,345 E 12/2003 Falciglia et al.
6,906,264 B1 * 6/2005 Grant, Jr. .............. H01B 7/366 174/102 R
8,278,554 B2 10/2012 Dollins et al.
11,101,056 B1 * 8/2021 Lafreniere ............ H01B 7/226
11,282,619 B2 3/2022 Lafreniere et al.
11,587,699 B2 2/2023 Lafreniere et al.
11,837,385 B2 12/2023 Lafreniere et al.
11,996,215 B2 5/2024 Lafreniere et al.
(Continued)

*Primary Examiner* — William H. Mayo, III
(74) *Attorney, Agent, or Firm* — Merchant & Gould P.C.

(57) ABSTRACT

Armored cables are prevalent in cable installations for safely installing conductors according to code regulations specifying a crush resistance of the sheathing layer. Armored cables can contain a preformed metal ribbon (e.g., metal sheath) having a specific profile shape as the outer layer of the armored cable surrounding a conductor core.

17 Claims, 5 Drawing Sheets

(56) References Cited

U.S. PATENT DOCUMENTS

| | | | | |
|---|---|---|---|---|
| 12,165,791 | B2 | 12/2024 | Lafreniere et al. | |
| 12,170,157 | B2 | 12/2024 | Lafreniere et al. | |
| 2009/0188694 | A1 | 7/2009 | Pereira et al. | |
| 2010/0186987 | A1* | 7/2010 | Aitken | H01B 9/028<br>174/102 R |
| 2013/0056105 | A1 | 3/2013 | Graham et al. | |
| 2014/0238718 | A1* | 8/2014 | Tanner | B32B 3/06<br>174/102 R |
| 2015/0107873 | A1* | 4/2015 | Wobick | H01B 7/28<br>174/110 R |
| 2022/0044841 | A1* | 2/2022 | Lafreniere | H02G 3/0468 |
| 2023/0163581 | A1* | 5/2023 | Bacon | H01B 13/22<br>174/102 D |
| 2023/0335313 | A1* | 10/2023 | Kopfer | H01B 7/226 |
| 2025/0069781 | A1 | 2/2025 | Lafreniere et al. | |

* cited by examiner

ARMORED CABLES WITH REDUCED PULLING FORCE

BACKGROUND

Armored cables are prevalent in cable installations for safely installing conductors according to code regulations specifying a crush resistance of the sheathing layer. Conventionally, armored cables have been designed with maximal crush resistance in mind, comprising a generally curved axial profile throughout the armor layer. Such cables can be constructed by helically wrapping a metal ribbon formed with a cross-sectional profile that allows successive turns of the ribbon to interlock and remain in secured position forming the cable exterior.

U.S. Pat. No. 6,906,264 provides an example of such an armor, wherein the armor comprises two symmetrically opposing semi-circular cross-sections, with a first semi-circular section facing away from the cable axis and a second semi-circular cross section facing toward the cable axis. In this manner, successive convolutions of the armor are able to securely interlock during construction, and withstand significant pulling forces against the cable axis caused by interactions between the wall structure and the armored cable during installation.

U.S. Pat. No. 11,587,699 provides several additional examples of armor profiles that may be employed in cable assemblies. As contemplated therein, the profile of the metal ribbon was designed to prevent excessive hang ups during installation which may cause installer fatigue and/or damage to studs of a structure being wired. The cables disclosed therein purportedly experienced a reduced pulling force attributed to having a minimal valley width, the valley width defined by inflection points between interlocking sections of the metal sheath profile. More generally, U.S. Pat. No. 11,587,699 discloses metal sheath profiles where the axial length of intersections of successive wraps of the metal sheath are as small as possible relative to the other portions of the metal sheath, to minimize the opportunity for objects (such as wall supports) to intervene within the intersections during pulling.

However, independent pull force testing has demonstrated that the cables disclosed in U.S. Pat. No. 11,587,699 do not demonstrate a decreased pull force relative to conventional armored cable designs, and therefore the present disclosure is directed to alternate designs having reduced pulling force.

SUMMARY

Armored cable assemblies comprising a conductor core and an interlocking armor layer helically wrapped around the conductor core are disclosed herein. The armor layer can have a cross-sectional profile comprising an interlock extending axially toward the cable interior; an interlock receiver extending away from the cable interior; and an intermediate segment extending between the interlock and the interlock receiver. In certain aspects, the intermediate segment can have a maximum incline angle less than about 35°. In other aspects, the intermediate segment has a width in a range from two to ten times the interlock height.

DETAILED DESCRIPTION

Figure 1:
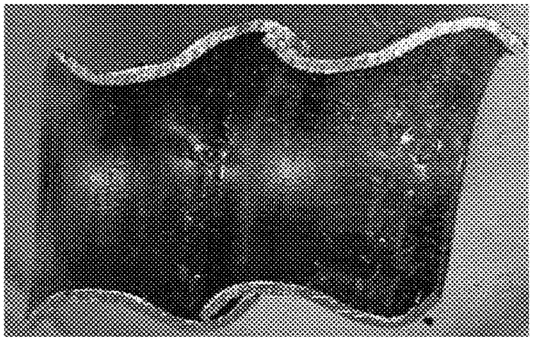
FIG. 1 (Prior Art)
FIG. 1 is a photograph of a cross section of a first comparative example of a cable sheath.

Armored cables are disclosed herein comprising a preformed metal ribbon (e.g., metal sheath) having a specific profile shape. In addition to its profile, the metal ribbon also may be defined by its other dimensional features, such as thickness and cross-sectional width. It will be understood that the length of the ribbon may be determined by the length of cable desired, and therefore not limited by the cross-sectional profile of the ribbon. Common thicknesses of armored cable will be apparent to those of skill in the art, and in certain aspects can be in a range from 3 mil to 50 mil (e.g., 16 mil, 18 mil, 22 mil, etc.). Generally, the cross-sectional width of the ribbon may be any that allow an efficient construction (e.g., by limiting the number of convolutions required for a given length) while maintaining an adequate crush resistance. In certain aspects, the ribbon can have a cross-sectional width in a range from 3 mm to 50 mm, from 5 mm to 20 mm, or from 8 to 12 mm.

Armored cables disclosed herein may further be described by their crush resistance. Generally, crush resistance of cables disclosed herein may be any suitable for the application for which the cables are intended, as generally may be determined by relevant codes and specifications, e.g., an average crush resistance of 1000 lbf or greater, as defined across ten trials performed according to UL 1569.

Armored cables disclosed herein also may be defined by an interlocking force, or the maximal axial pulling force the cable is able to withstand without being damaged.

Armored cables disclosed herein also may be defined by a pulling force. The pulling force of the cable may be defined generally as the amount of resistance force generated against pulling a length of the cable through a conduit or wall structure during installation. Generally, the pull force will be higher for cables that exhibit excessive hang-ups and resistance during pulling. Surprisingly, cables disclosed herein demonstrated a drastically reduced pulling resistance relative to conventional cables, such as those disclosed in U.S. Pat. No. 11,587,699. Certain embodiments disclosed herein can demonstrate a pulling resistance at least 10% less, at least 20%, at least less 30% less, at least 40% less, at least 50% less, or at least 80% less than that of armored cables such as Southwire's Armorlite® Type MC having a conventional profile, or AFC's MC Glide Lite™ which is marketed as having a low profile armor sheath.

In certain aspects, cables constructed to comprise an armor layer as disclosed herein can comprise an average pulling resistance as determined by example procedure below may be in a range from about 1 N to 25 N from about 3 N to about 20 N, from about 5 N to about 15 N. Hang-ups during installation can cause excessive pulling resistance, and lead to cable damage. Cables disclosed herein reduce the amount and severity of hang-ups, and therefore may result in a reduced maximum pulling resistance. In certain aspects, cables disclosed herein can have a maximum pulling resistance as defined by the exemplified procedure below of less than 100 N, less than 75 N, less than 60 N, less than 50 N, less than 40 N, less than 30 N, less than 20 N, or less than 10 N.

Smoother pulling during installation also may be measured by comparing the observed standard deviation in pulling resistance against a constant applied force over a number of measurements. In certain aspects, the standard deviation of pulling resistance values may be reduced relative to other cable assemblies with conventional armor profiles. In certain aspects, the standard deviation of pulling resistance measurements can be reduced by more than 10%, more than 20%, more than 30%, more than 40%, more than 50%, more than 60%, or more than 70%, relative to conventional cables as exemplified herein. In certain aspects the standard deviation of the pulling resistance can be in a range from 1 to 10 N, from 2 to 8 N, or from 3 to 5 N.

Without being bound by theory, the surprisingly improved performance of armored cables disclosed herein may demonstrate a reduced pulling resistance and acceptable crush resistance according to their dimensions. As stated above, previous efforts have been directed to minimizing the gap (e.g., "valley width" as defined by U.S. Pat. No. 11,587,699) formed between successive convolutions of cable armor in order to minimize the prevalence of hang-ups. Surprisingly, and contrary to the teaching of the previous disclosures, it was found that increasing the width of this gap formed at the intersection of successive convolutions of the metal sheath wrapped upon itself resulted in a cable assembly having a significantly reduced pulling resistance force.

As applied to examples disclosed herein, the exemplary pulling performance of cables disclosed herein can, at least in part, be attributed to the shape and dimensions of its armor sheath. In certain aspects, the armor sheath may be helically wound from a material ribbon, the ribbon comprising a cross-sectional profile that allows successive convolutions of the ribbon to securely interlock and form the armor sheath around a conductor core.

In certain aspects, the armor sheath generally can comprise, or consist of, successive convolutions of an interlocking section and an intermediate segment spanning the distance between successive interlocking sections. In certain aspects, the interlocking section can be configured as the mechanism by which successive turns of the armor sheath interlock and remain in a helically wound construction. An interlocking force can be defined against a pull resistance force exerted axially on the armor cable sheath during installation. In certain aspects, the interlocking section can be defined by mating sections on successive turns of the armor sheath. The mating interlocking sections may be symmetrical or asymmetrical. In certain aspects, the armor sheath profile can comprise an interlock receiver and an interlock protrusion, where the interlock receiver is configured to receive the interlock protrusion of an adjacent turn of the sheath, and similarly, the interlock protrusion is configured to protrude into, and interlock against, an interlock receiver of an adjacent turn of the armor sheath.

As applied to a first inventive Example 3 (FIG. 3) the armor sheath having a profile as defined herein can have an interlock receiver 102, interlock protrusion 106, and intermediate segment 104, in any suitable arrangement that provides an acceptable crush resistance (e.g., 1000 lbf), sufficient interlocking force, and reduced pulling resistance.

It follows that the sheath profile generally can be any shape that gives rise to the construction above, having an interlocking section and intermediate section. For instance, in certain aspects, the shape of the interlock receiver may be semi-circular. In other aspects, the interlock receiver can comprise, or consist of, a curved (e.g., a quadrant) or straightened portion extending away from the cable axis. In such aspects, the interlock protrusion can comprise, or consist of, a curved or straightened portion extending toward the cable axis. In certain aspects, the sheath profile can be defined as having a proximal end and a distal end, the proximal end being generally nearer the interlock receiver and the distal end being generally nearer the interlock protrusion. In this manner, the relative positions of profile features can be described as being proximal or distal.

For purposes of this disclosure, the intermediate section can be considered to span the length of the profile for each convolution when in an interlocking position. Thus, as exemplified by FIGS. 2 and 3, the interlocking position can comprise where the interlocking protrusion is adjacent and in contact with the interlock receiver, by action of an axial pulling force. A proximal endpoint of the intermediate segment therefore can be measured as the portion of the profile extending from the position of the interlock receiver at which the interlock protrusion terminates in the pulled position. A distal endpoint of the intermediate segment can be the position of the interlock protrusion at the interlock height.

Figure 3:
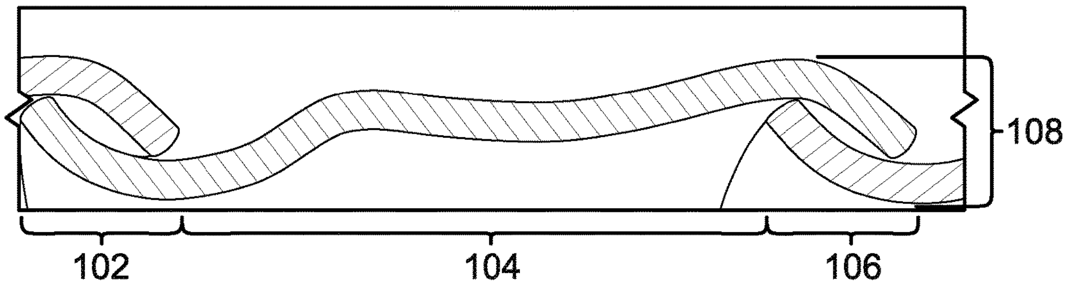
FIG. 3 is a photograph of a cross section of a first inventive example of a cable sheath.

The intermediate segment also may be defined as having a both a nominal length (e.g., the length of the metal ribbon) as well as a width defined as the longitudinal distance relative to the cable axis traversed by the connector between successive interlocks when assembled. As an Example, FIG. 3 provides an example wherein intermediate segment 104 has a width of 7 mm. In certain aspects, the width of the intermediate segment can be in a range from 2 mm to 20 mm, or from 5 to 10 mm.

In certain aspects, the sheath profile also may be defined by in interlock height. Generally, the interlock height will also equal the total axial height of the sheath profile, provided the intermediate segment extends from a point closest to the cable axis at the interlock receiver to a point furthest away from the cable axis where the interlock protrusion begins. In such aspects, the interlock height therefore can be defined as the axial distance between the innermost point of the armor sheath and the outermost point of the armor sheath within the interlocking section. As pictured in FIG. 3, the interlock height 108 can be about 1.6 mm in certain aspects. In other aspects, the interlock height can be in a range from 0.5 mm to 5 mm, from 0.2 mm to 3 mm, or from 1 to 2 mm. In other aspects, the intermediate segment can be characterized by a ratio between its width and the profile height. In certain aspects, the width of the intermediate segment can be in a range from two times the interlock height to ten times the interlock height, from three times the interlock height to eight times the interlock height, or from three times the interlock height to five times the interlock height.

Figure 2:
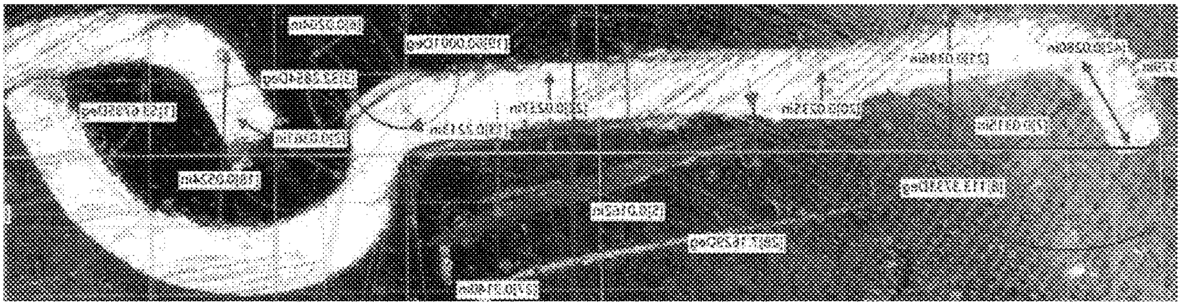
FIG. 2 (Prior Art)
FIG. 2 is a photograph of a cross section of a second comparative example of a cable sheath.

It follows that the intermediate segment further may be defined by a maximum angle of incline relative to the cable axis. Conventional designs of U.S. Pat. No. 11,587,699 seek to provide extended flat portions along the profile (e.g., a 0° angle of incline) and minimize gaps between those flat portions to reduce the amount of the gaps occurring along the dimension of the cable axis and along the exterior of the cable sheath. As a result, conventional low profile designs can include sharp angles of incline along the length of the cable exterior, e.g., by narrowing a valley width as shown in FIGS. 1-2. Inventive Examples of the present disclosure-contrary to the conventional approach of minimizing gaps at the interlock receiver-can extend the relevant dimension to a degree that reduces the maximum angle of incline along the convolution. Surprisingly, reducing the maximum angle of incline along the convolution allowed the cable to be pulled along an axial dimension with a reduced pulling force due to the lack of abrupt increases in the angle of incline along the metal sheath profile. In certain aspects, the maximum angle of incline throughout the intermediate segment can be less than 60 degrees, less than 45 degrees, less than 40 degrees, less than 35 degrees, less than 30 degrees, less than 25 degrees, or less than 20 degrees. Further, the variation in the angle of incline along the length of the convolution can be less than 3° per mm, less than 5° per mm, less than 10° per mm, less than 15° per mm, throughout the sheath profile. Alternatively, a maximum variation throughout the length of the cable can be in a range from 1° to 20° per mm, from 3° to 10° per mm, or from 3° to 5° per mm. Without being bound by theory, the relatively constant angle of incline as described also may allow the cable sheath to be pulled in an opposite direction (e.g., in the direction from the distal end to the proximal end of the cable), with a reduced pulling force.

As used herein, the maximum angle of incline will be understood as an average of the incline along a length of the convolution in the direction of the cable axis in order to exclude cable exteriors which may have small imperfections resulting in a large angle of incline despite otherwise qualifying as described herein. In certain aspects the maximum angle of incline can be defined at any point along the length of the convolution as the average of incline over a 1 mm length centered on the point in question. In this manner, a maximum value of these angles of incline can be identified.

In certain aspects, the intermediate segment can comprise a constant angle of incline. Alternatively, the intermediate segment can comprise one or more undulations resulting in a varying angle of incline relative to the cable axis along the width of the intermediate segment. For the purposes of this disclosure, an undulation can be defined as a positive deviation (deviation away from the cable axis) from a midline drawn between the internal surface at the proximal end of the intermediate segment (e.g., a bottommost point of the interlock receiver) and an external surface at the distal end of the intermediate segment (e.g., the height of the interlock protrusion). In certain aspects, the undulation can have an undulation peak at the position where the undulation has a maximum positive deviation from the midline of the intermediate segment. In certain aspects, an undulation can have a deviation greater than the width of the armor sheath, or in a range from 0.2 to 2 mm, or from 0.3 to 1 mm, or from 0.3 to 0.5 mm. In other aspects, the undulation can have a width in a range from 0.1 mm to 1 mm, from 0.2 to 0.8 mm, or about 0.5 mm. In other aspects the undulation width can be about 20% the width of the intermediate segment (or from 10 to 40%, or from 10 to 25%). In other aspects the undulation height can be defined relative to the interlock height, and in certain aspects can be at least 30%, at least 50%, at least 70%, or at least 85% of the interlock height. In certain aspects, the undulation may not cause the intermediate segment to exceed any maximum angle of incline as disclosed above.

Figure 4:
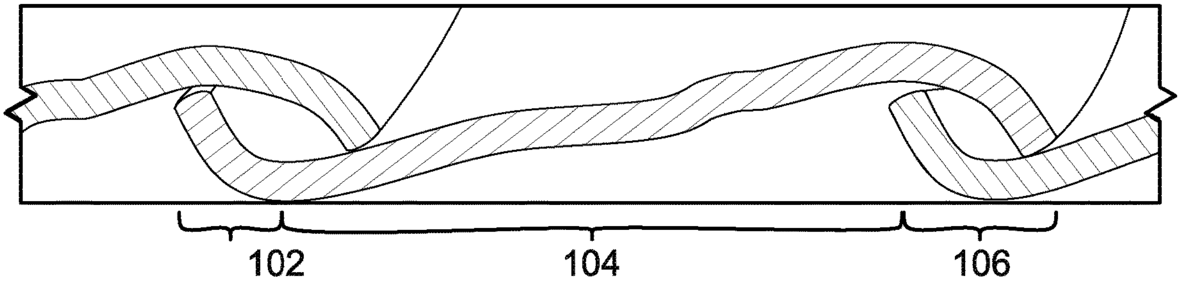
FIG. 4 is a photograph of a cross section of a second inventive example of a cable sheath.

Alternatively, the undulation can be described by an undulation radius defined as the radius of a circle best fit to the external profile of the undulation peak. For instance, the profile shown in FIG. 2 has an undulation radius of approximately 0.4 mm. As shown, this can create relatively sharp angles on the cable exterior that may contribute to the increased pull forces observed in Examples below. Alternatively, embodiments having a larger undulation radius (e.g., FIG. 3 approximately 1.6 mm; FIG. 4, approximately 0.7 mm) may result in smoother features and a smoother pull. In other aspects, the undulation radius may be in a range from about 0.5 mm to about 2.5 mm, from about 0.7 mm to about 2 mm, from about 0.8 mm to about 1.5 mm, or about 1 mm. Of course, in other aspects, the undulation radius may be relatively large (as shown in FIG. 2, approximately 10 mm) or even approach infinity within embodiments where no undulation is present along the intermediate segment (e.g., as shown in FIG. 4).

Where present, the undulation may also be defined by an undulation angle formed by a first line extending from the undulation peak toward a distal end of the intermediate segment along a first best fit defined by the external surface of the intermediate segment a distance of 1 mm, and a second line extending from the undulation peak toward a proximal end of the intermediate segment along a second best fit line defined by the external surface of the connector profile a distance of 1 mm. As shown in FIG. 2, the undulation angle for commercially available cables can be about 110° or lower, and as above, can result in sharp external cable features that may cause increased pull forces. In contrast, the embodiments disclosed herein having a larger undulation angle (e.g., FIG. 3, approximately 136°, FIG. 4, approximately 150°) may result in a smoother exterior profile along the intermediate segment. In other aspects, the undulation angle can be in a range from 115° to 170°, from 120° to 160°, from 125° to 165°, or from 130° to 145°. Of course, in aspects where the undulation is absent or very slight, the undulation angle can be approximately 180°.

Without being bound by theory, the presence of one or more undulations within the intermediate segment may ensure that bi-directional pulling remains possible and improve crush resistance of the cable. The intermediate segment may have one, or more than one (e.g., 2, 3, 4, or 5) undulations, positioned evenly throughout the connector, or spaced irregularly. The position of an undulation can be any suitable to allow the cable to pull smoothly at high speeds, and without causing hang-ups at slower speeds or during pauses in the pulling operation. The position of the undulation may be defined at the undulation peak, relative to a proximal end of the intermediate segment (e.g., at the interlock receiver) and may be coplanar with the highest point of the interlock. In certain aspects, the undulation peak can be positioned approximately 3.5 mm from the proximal end of the interlock receiver. Alternatively, the undulation peak can be positioned in a range from 1 to 10 mm, from 2 to 5 mm, or from 3 to 4 mm from the proximal end of the interlock receiver. As defined herein, the features of the intermediate segment may be described as proximal to indicate relative position toward the interlock receiver, and distal to indicate a relative position closer to the interlock protrusion.

In other aspects, the undulation position can be defined as having a peak at a certain position along the intermediate segment. In certain aspects, the intermediate segment can comprise an undulation peak at a position approximately 20% along the intermediate segment, measured such that 0% represents a position at the proximal end of the intermediate segment and 100% represents a position at the distal end of the intermediate segment. In other aspects, the position of the undulation peak can be in a range from 10% to 60% of the intermediate segment, or from 15% to 50% of the intermediate segment, or from 20% to 40% of the intermediate segment.

In certain aspects, portions of the intermediate segment can be substantially planar, having a constant angle of incline along its length (e.g., varying by no more than 5 degrees, 10 degrees, or 15 degrees). For instance, the intermediate segment can comprise an undulation separating the intermediate segment into a proximal end and a distal end. In such aspects, the distal connector end can be substantially planar as directly above. The proximal end of the intermediate segment can have a curved or linear profile, and in certain aspects, can have an angle of incline different from the remainder of the intermediate segment.

Given the disclosure above, armor sheaths are contemplated herein comprising a sheath profile having an interlock receiver, an intermediate segment, and an interlock protrusion. The intermediate segment can comprise an undulation having an undulation peak at a position in a range from 10 to 50% of the distance from the proximal end of the intermediate segment. Alternatively, or additionally, the undulation peak can be within 1 mm to 3 mm from the proximal end of the intermediate segment. In these aspects, the intermediate segment can have a maximal angle of incline of less than 60°, less than 45°, or less than 30°. In still further aspects, the intermediate segment can have a substantially planar angle of incline (e.g., no incline, or substantially parallel to the cable axis) from the undulation peak to the distal end of the intermediate segment.

The shape of the interlock receiver and interlock protrusion also can affect the profile characteristics (and therefore the pull resistance) of the cable sheathing. Generally, the interlock protrusion extends into the interlock receiver, forming a contact surface able to resist lateral displacement of the cables. When a lateral force is applied to the cable, the interlock protrusion interlocks with a surface of the interlock receiver and prevents the cable sheathing from being pulled apart. In certain aspects, the interlock receiver can be curled away from the cable axis less than 10°, less than 30°, less than 45°, less than 60°, less than 75°, less than 90°, less than 105°, less than 120°, or less than 135°; alternatively, in a range from about 30° to about 120°, from about 30° to about 90°, from about 30° to about 75°, from about 30° to about 60°, or from about 45° to about 75°. Similarly, interlock protrusions also can comprise a curl, but toward the cable axis to create a complementary mating surface relative to the interlock receiver. Accordingly, interlock protrusions can be curled toward the cable axis less than 10°, less than 30°, less than 45°, less than 60°, less than 75°, less than 90°, less than 105°, less than 120°, or less than 135°; alternatively, in a range from about 30° to about 120°, from about 30° to about 90°, from about 30° to about 75°, from about 30° to about 60°, or from about 45° to about 75°. Generally, a difference in the curl of the interlock receiver and the interlock protrusion can be less than 45°, less than 30°, or less than 10°; or alternatively, in a range from 0° to 30° or from 0° to 15°.

Interlock receivers having a curl greater than 90° may be expected to improve the axial strength of the cable, by creating a larger contact surface to resist an axially applied force. However, a curl of about 90° or more can have a greater interlock height due to the interaction between the curled end of the sheath extending axially outward into the bottom surface of the intermediate section of the adjacent convolution. While the increased interlock height is not problematic to conventional designs unconcerned with incidence angle in an intermediate segment, in the context of this disclosure it will be understood that increasing the interlock height also increases the incidence angle in at least some portion of the intermediate segment.

Surprisingly, it was found that interlock receivers comprising a curl less than 75°, or in a range from 45° to about 75°, were sufficiently effective at resisting axial pull forces, particularly where the difference in the curl between the interlock receiver and the interlock protrusion was less than about 30° (e.g., less than 15°). This remained true even for embodiments where the intermediate segment of an adjacent convolution does not contact the receiving surface of the Also disclosed herein are systems to connect low profile cable sheaths disclosed herein comprising. Metal sheaths are disclosed herein, generally having a reduced incidence angle in the intermediate section and resulting in an expanded or eliminated gap between adjacent convolutions of the cable sheathing to become hung on obstructions during the pull. The reduced incidence angle can be detrimental to crush resistance (by extending the length of the respective convolutions relative to its height) and to lateral pull strength (from reduced contact surface area between the respective convolutions). For the same reasons, the lack of an angular surface can present a challenge to form secure connections of the cable sheathing with conventional connectors.

An embodiment of a connector suitable for use to secure the cable sheathing disclosed herein to a junction box or a disclosure, as shown in FIGS. 7A-7F and FIGS. 8A-8E. FIGS. 7A-7E represent several views of a connector sleeve configured to connect to the exterior of the metal sheathing. Generally, the sleeve can be formed as a cylindrical ring 700 that may open at a vertical joint 710 to allow the sleeve to be fitted to the cable sheathing. The sleeve has tabs 720 extending into the interior of the cylinder, which are able to secure the cable sheathing within the sleeve through a contact point at the interlock protrusion and/or the proximal end of the intermediate segment. The tabs have angled tips 722 which are able to apply pressure to the contact point and additional bite to secure the connection for a range of cable sheathing diameters. The sleeve also comprises external fins 730 for securing the sleeve to the complementary portion of the connector as shown in FIGS. 8A-8E. Once the sleeve is assembled within the connector, fins 830 can secure the connector to the junction box or enclosure.

Examples

Three metal-clad armored cables were examined for their pull characteristics. Comparative Example 1 ("CE1") was performed on a section of Southwire Armorlite® Type MC ("SW-MC"), commercially available since at least 2016, having a conventional sheath profile as shown in FIG. 1. Comparative Example 2 ("CE2") was performed using a section of aluminum armored cable having a low-profile sheath as shown in FIG. 2. A first Inventive Example ("IE1") was performed on an armored cable having an aluminum sheath with a sheath profile as shown in FIG. 3. A second Inventive Example ("IE2") was performed on an armored cable having an aluminum sheath with a sheath profile as shown in FIG. 4. Table I summarizes cable characteristics and dimensions.

TABLE I

Cable characteristics and dimensions.

| | CE1 | CE2 | IE1 | IE2 |
|---|---|---|---|---|
| Maximum incline (°) | 28 | 90 | 45 | 10 |
| Nominal undulation peak position (relative to proximal end of intermediate segment) | N/A | 1.8 mm | 2.3 | N/A |
| Relative Undulation peak position (relative to proximal end of the intermediate end) | N/A | 26% | 33% | N/A |

Figure 5:
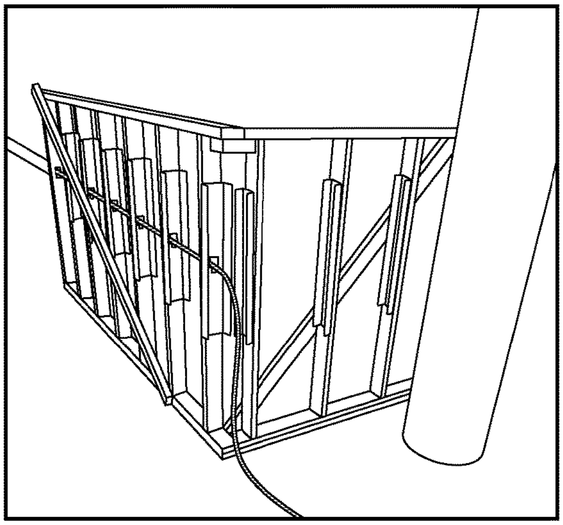
FIG. 5 is a photograph of the test wall and experimental apparatus employed to pull each test cable.
Figure 6:
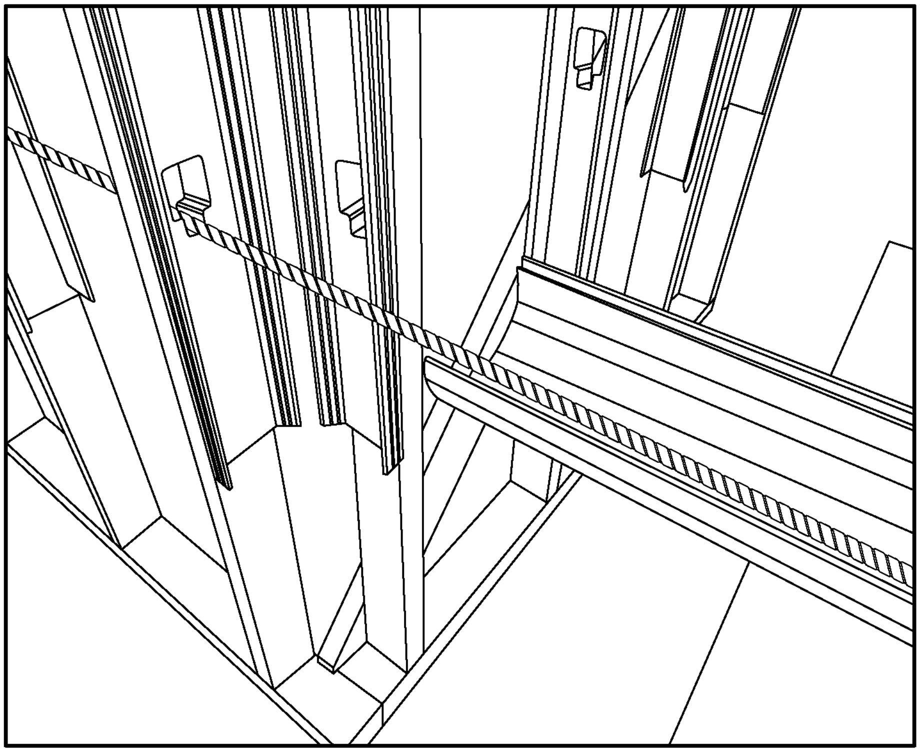
FIG. 6 is a photograph of an aluminum stud of the test wall depicted in FIG. 5.
Figure 7A:
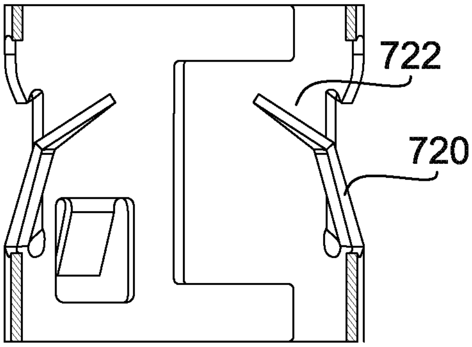
FIG. 7A is a cross-sectional view of a connector sleeve used within a connector, for connecting metal clad cables to a junction box or enclosure.
Figure 7B:
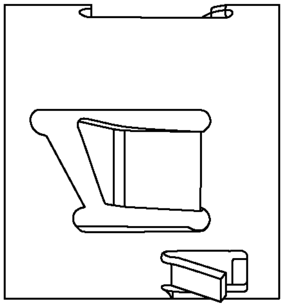
FIG. 7B is a left side view of the connector sleeve depicted in FIG. 7A.
Figure 7C:
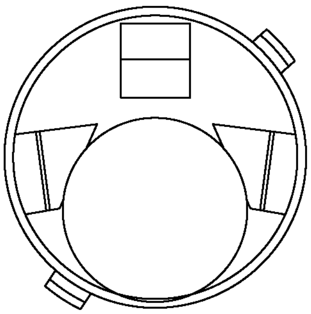
FIG. 7C is a top view of the connector sleeve depicted in FIG. 7A.
Figure 7D:
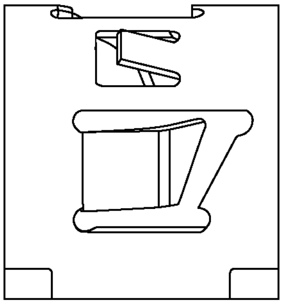
FIG. 7D is a right side view of the connector sleeve depicted in FIG. 7A.
Figure 7E:
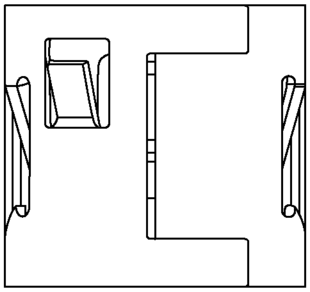
FIG. 7E is a front view of the connector sleeve depicted in FIG. 7A.
Figure 7F:
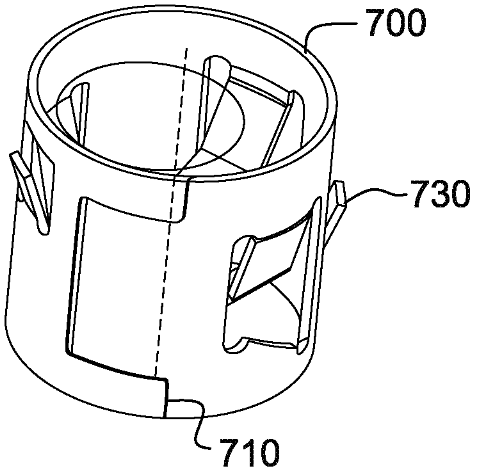
FIG. 7F is a perspective view of the connector sleeve depicted in FIG. 7A.
Figure 8A:
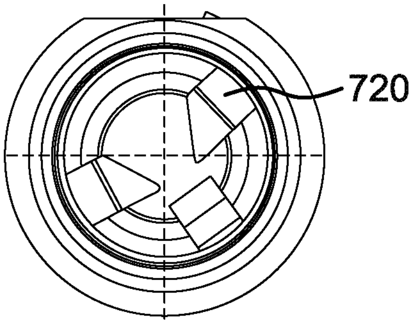
FIG. 8A is a bottom view of the connector assembled with the connector sleeve depicted in FIG. 7A-FIG. 7F.
Figure 8B:
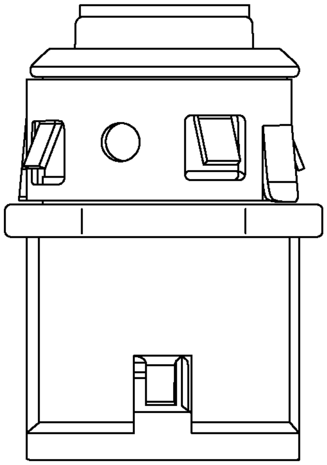
FIG. 8B is a front side view of the connector depicted in FIG. 8A.
Figure 8C:
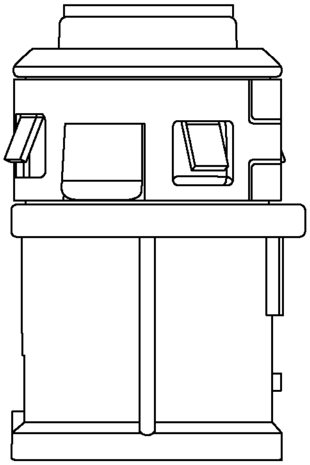
FIG. 8C is a left view of the connector depicted in FIG. 8A.
Figure 8D:
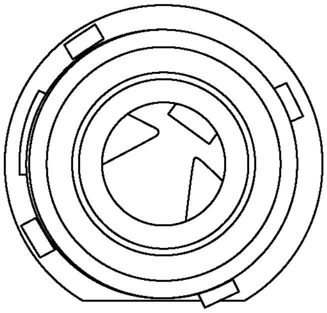
FIG. 8D is a top view of the connector depicted in FIG. 8A.
Figure 8E:
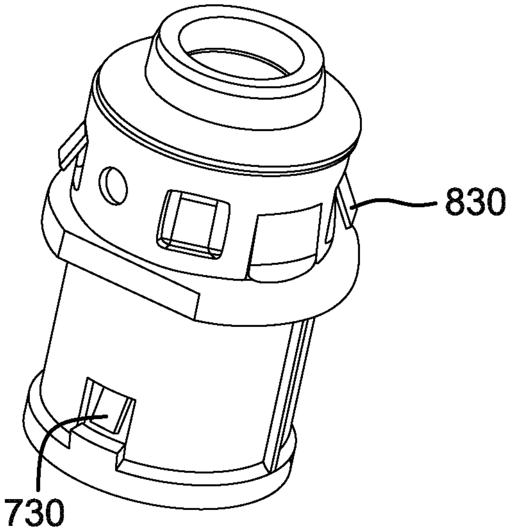
FIG. 8E is a perspective view of the connector depicted in FIG. 8A.

Each cable was pulled through a test wall as shown in FIG. 5, the test wall comprising seven aluminum studs spaced at 16" intervals and comprising an intermediate punched hole at a constant height through which the exemplified armored cables may be pulled. An exit trough was placed at the exit end of the test wall to support the weight of the load cell measurement device in line with the tugger, to ensure that the weight of the load cell did not influence the resulting pull force readings. In certain examples, an entrance trough was also aligned with the first opening in the series of aluminum studs to support the pulled cable at the height of the pull, to allow the cable to enter the test wall aligned with the series of punched holes within the test wall.

A 15 ft sample length of each MC cable was threaded through each of the seven studs of the test wall by hand so that one loose cable end protruded from the tugger side of the wall and a longer loose end protruded from the back. In this manner, the sample remained in contact with each aluminum stud during the complete range of the test. A tugger comprising a load cell was mounted in line with the MC cable along the direction of the cable threaded through the wall. The tugger pulled the cable through the wall over a distance of approximately 7-10 feet at three different pull speeds (10.4 feet per minute, 29.1 feet per minute, and 50.1 feet per minute). As will be understood by those of skill in the art, pull speeds are representative of settings of the cable tugger, and may vary from the instantaneous pull speed of the sample at any particular data point. The pull resistance at the load cell was recorded at regular intervals (approximately 3/s) as the tugger pulled each cable through the wall. Examples were performed in triplicate. Data points obtained during each triplicate pull are summarized in Tables II-IV below.

Without prejudice, data from the 10.4 fpm pull without a support trough in Table II is generally representative, for discussion. As shown in Table II, Comparative Example 1 had an average pull resistance of 13.4 N, reaching a maximum of 27.1 N and a standard deviation of 3.0 N.

Surprisingly, Comparative Example 2, which is designed and marketed as a smoother pulling alternative to conventional MC cables, failed to outperform even Comparative Example 1. Comparative Example 1 outperformed Comparative Example 2 cable in both average pulling force and standard deviation of pulling force. The failure of Comparative Example 2 to outperform Comparative Example 1 despite being designed and marketed to slide through metal studs and ceilings easily for smoother pulls demonstrates a continued commercial need for such a cable.

More surprisingly, Inventive Examples 1 and 2 disclosed herein each demonstrated reduced pulling force relative to conventional cables to address the commercial need. The average pull resistance observed during the pull of the Inventive Example was only 55% that of Comparative Example 2 and 85% that of Comparative Example 1, each representing a drastically reduced pulling force. The Inventive Example also demonstrated a much more consistent pull resistance with a standard deviation in pull values reduced to nearly a third that observed by Comparative Example 2. The maximum pull force also is drastically reduced relative to both Comparative Examples 1-2, to merely 56% that of observed during pulling Comparative Example 2 through the test wall.

Without being bound by theory, it is believed that the presence of an undulation at an intermediate location along the connecter relative to the interlock receiver, as opposed to a proximal location or a distal location (or absent an undulation altogether), can lead to the unexpectedly reduced pull resistance demonstrated by Inventive Example disclosed herein.

As shown in FIG. 3, Inventive Example 1 comprises an undulation having a peak at an intermediate position along the intermediate segment (e.g., approximately 2 mm, or from 0.5 to 3 mm, or from 1 to 3 mm, or from 1.5 to 2.5 mm). The intermediate placement of the undulation allows the angle of incline leading into the undulation peak to remain less than 45° (e.g., below 40°, below 35°, below 30°, below 25°, below 20°, or below 15°). Thus, even when pulling speeds are not sufficient to allow interferences to skip over the gap between the undulation and the interlock, thereby allowing the interfering wall structure to settle within the gap, the cable may be easily pulled at maximum pull resistances similar to existing cables. In this manner, Inventive Example 1 is able to eliminate the possibility of the cable being caught within gaps formed between the interlock and undulation when pulled at slower speeds, by maintaining a maximum angle of incline throughout the conductor span less than or equal to that of Comparative Example 2 (or any range disclosed herein).

Inventive Example 2 provides a second alternative to the conventional low-profile armored cables that also resulted in surprisingly low pull forces when installed in the test wall. As shown in Tables II-III below, Inventive Example 2 demonstrated an average pull resistance almost identical to that of Inventive Example 1. As shown in FIG. 4, the sheath of Inventive Example 2 does not comprise an intermediate undulation yet is able to achieve an exceedingly low pull resistance. Without being bound by theory, it is believed that the combination of a relatively constant angle of incline along the length of the sheath convolution allows the constructed cable to pull smoothly along the surface of the punched holes in the aluminum studs. The low angle of incline allows the cable to maintain a smooth pull even without an intermediate undulation in the sheath profile, as present in Inventive Example 1. Inventive Example 2 maintains a relatively low interlock height in contrast with a relatively extended convolution width, to reduce the maximum incline angle of the armor profile. Inventive Example 2 is thereby able to achieve a maximum incline angle of 10°, although in certain aspects it is contemplated that the maximum angle of incline may be less than 30°, less than 25°, less than 20°, less than 15°, or less than 10°, and achieve a similar effect. As mentioned above, this may be achieved by employing a relatively large ratio of the convolution width to the interlock height, which in certain aspects can be in a range from 3:1 to 10:1, from 4:1 to 7:1, from 4:1 to 6:1, or about 5:1.

Analyzing the complete summary of data provided in Tables II-III highlights additional surprising trends. For instance, Inventive Examples 1-2 each demonstrated a much more consistent pull resistance throughout each experiment, as evidenced by relatively low maximum pull resistance values, and standard deviations. This effect was more apparent when the supporting trough was removed from the entrance, which may have allowed greater opportunity for the aluminum stud to become lodged within the valleys of the respective cable convolutions as the cable was pulled. As demonstrated, where the cable is not aligned with the pull path, the cable may interact with the stud in greater degree and cause the cable to hang along the pull resulting in enormously increased pull resistance values (e.g., Table III, CE2, without supporting trough). Inventive Examples 1-2 were able to avoid such hang-ups due to an extended interlocking section and relatively low maximum angle of incline throughout each convolution of the cable sheath.

Inventive Examples 1-2 as constructed thereby surprisingly demonstrate a reduced pull force relative to conventional MC cables. Examples provided herein have demonstrated an average pull resistance under the experimental protocols described herein of less than 95%, less than 90%, less than 85%, less than 75%, less than 60%, or less than 50%, relative to that of conventional designs such as Comparative Examples 1-2 provided herein. Further, the inventive examples herein demonstrate a reduced maximum pull resistance under any experimental protocol described herein, resulting in an overall smoother pull with reduced hangups during pulling. In certain aspects, the maximum pull resistance may be reduced to less than 95%, less than 90%, less than 85%, less than 75%, less than 60%, less than 50%, or less than 30% relative to that of conventional designs such as Comparative Examples 1-2.

Reversed Orientation Pull Data

Each of the samples of cable described above was also pulled through the test wall in a reversed orientation. As used herein, the orientation of the pull generally is defined according to the orientation presented in FIGS. 1-4, where pulling the cable from the left side of the page represents a forward orientation pull, and pulling the cable from the right side of the page represents a reverse orientation pull. As will be understood by those of skill in the art, the forward orientation pull resulted in the cable exterior passing along a generally increasing angle of incline between each convolution interlock. In contrast, the reverse orientation pull resulted in the cable exterior passing along a generally decreasing angle of incline between each interlock.

Note that the studs of the test wall also may have a directionality, for instance, due to the presence of burrs remaining along the edges of the punched hole within the aluminum stud during manufacture. Thus, the cable pull may also be defined as either of a forward or reverse direction pull through the test wall, in either of the forward or reverse orientation. In certain aspects, the cables disclosed herein can exhibit advantageously reduced and consistently low pull forces in both the forward and reverse directions, for instance where a cable is pulled primarily in a forward direction, but needed to be "backed out" of the pull in a reverse direction. Reverse direction pulls may also occur with respect to individual studs of the installation wall.

Further improvements to the reduced pull force observed by cables disclosed herein may be achieved by use within stud systems where the directionality of the studs is removed. For instance, pulling the cables disclosed through studs wherein no burrs were present was qualitatively observed to result in a drastically reduced pull force, relative to pulling through studs where burrs were present. Thus, it is contemplated that the maximum pull forces observed in examples herein, standard deviations, and average pull forces, may be further reduced by use in systems that employ studs manufactured by processes that eliminate burrs on the punched holes of the studs. Data from each reverse orientation pull is presented in Table IV. As above, each of the inventive examples drastically outperformed the comparative examples, and particularly CE2. Inventive Example 1 showed a surprisingly lower standard deviation indicating an overall smoother pull, lower average pull force indicating an easier pull, and a lower maximum pull force. Pull force required to pull the inventive examples was approximately 10-30% that of the commercially available competitor Comparative Example 2. Surprisingly, this represents a reduction of pull force values of about 70-90% relative to Comparative Example 2, which is marketed as allegedly being able to "slide easily through metal studs." Inventive Example 2 shows a similar improvement in the pull force data, as evident by the values in Table IV.

TABLE II

Pull resistance data for various pull speeds without supporting trough.

| | CE1 | CE2 | IE1 | IE2 |
|---|---|---|---|---|
| 10.4 fpm pull speed | | | | |
| Average (N) | 13.4 | 20.9 | 11.4 | 11.5 |
| Standard deviation (N) | 3.0 | 8.0 | 3.4 | 1.8 |
| Maximum pull force (N) | 27.1 | 50.7 | 28.5 | 16.5 |
| 29.1 fpm pull speed | | | | |
| Average (N) | 17.1 | 21.8 | 10.8 | 12.3 |
| Standard deviation (N) | 4.1 | 13.9 | 2.3 | 1.9 |
| Maximum pull force (N) | 36.5 | 75.6 | 19.6 | 20.0 |
| 50.1 fpm pull speed | | | | |
| Average (N) | 14.9 | 18.7 | 11.2 | 11.9 |
| Standard deviation (N) | 2.2 | 12.5 | 1.4 | 1.2 |
| Maximum pull force (N) | 22.7 | 87.6 | 19.1 | 15.1 |

TABLE III

Pull resistance data for various pull speeds with supporting trough.

| | CE1 | CE2 | IE1 | IE2 |
|---|---|---|---|---|
| 10.4 fpm pull speed | | | | |
| Average (N) | 7.9 | 9.3 | 5.3 | 6.0 |
| Standard deviation (N) | 1.5 | 3.6 | 0.7 | 0.9 |
| Maximum pull force (N) | 13.8 | 30.2 | 9.3 | 9.3 |
| 29.1 fpm pull speed | | | | |
| Average (N) | 8.4 | 7.6 | 5.4 | 5.8 |
| Standard deviation (N) | 1.2 | 2.6 | 0.8 | 0.6 |
| Maximum pull force (N) | 12.4 | 20.5 | 12.9 | 8.0 |
| 50.1 fpm pull speed | | | | |
| Average (N) | 11.5 | 9.2 | 5.8 | 6.0 |
| Standard deviation (N) | 1.1 | 2.2 | 0.6 | 0.8 |
| Maximum pull force (N) | 16.0 | 20.0 | 8.9 | 8.4 |

TABLE IV

Pull resistance data for reversed orientation pull with supporting trough (10.4 fpm pull speed).

| | CE1 | CE2 | IE1 | IE2 |
|---|---|---|---|---|
| 10.4 fpm (forward orientation) | | | | |
| Average (N) | 7.9 | 9.3 | 5.3 | 6.0 |
| Standard deviation (N) | 1.5 | 3.6 | 0.7 | 0.9 |
| Maximum pull force (N) | 13.8 | 30.2 | 9.3 | 9.3 |
| 10.4 fpm pull speed (reverse orientation) | | | | |
| Average (N) | 32.7 | 37.8 | 10.7 | 19.1 |
| Standard deviation (N) | 21.2 | 46.4 | 5.6 | 18.1 |
| Maximum pull force (N) | 109 | 236 | 26.9 | 96.7 |

The invention claimed is:

1. An armored cable comprising:

a cable sheath surrounding a conductor core, and having a cross-sectional profile comprising:

an interlock receiver extending from a first end of the cross-sectional profile to an innermost point of the cross-sectional profile;

an interlock protrusion extending from a second end of the cross-sectional profile to an outermost point of the cross-sectional profile; and an intermediate segment extending from the innermost point of the cross-sectional profile to the outermost point of the cross-sectional profile;

wherein:

a maximum angle of incline of the intermediate segment is less than 20°; and a width of the intermediate segment is in a range from two to ten times the interlock height wherein the cable sheath comprises a metal ribbon wrapped helically such that the interlock protrusion of a first convolution of the metal ribbon is secured within the interlock receiver of a second convolution of the metal ribbon, to form a plurality of interlocking convolutions; and wherein the armored cable has a reduced pull resistance characterized by a standard deviation of the pulling force of less than 1N when pulled through an aluminum stud wall at a pull speed in a range from about 10 to about 50 feet per minute.

2. The armored cable of claim 1, wherein the cross-sectional profile has an interlock height is in a range from about 0.5 mm to about 5 mm.

3. The armored cable of claim 1, wherein the interlock height is in a range from about 1 mm to about 3 mm.

4. The armored cable of claim 3, wherein a total axial height of the cross-sectional profile is equal to the interlock height.

5. The armored cable of claim 1, wherein the interlock receiver has a curl in a range from 30° to 75°.

6. The armored cable of claim 1, wherein the interlock protrusion has a curl in a range from 30° to 75°.

7. The armored cable of claim 1, wherein a curl of the interlock receiver is within 15° the curl of the interlock protrusion.

8. The armored cable of claim 1, wherein the intermediate segment does not comprise an undulation.

9. The armored cable of claim 1, wherein a variation of the angle of incline of the intermediate segment is less than 10° per mm.

10. The armored cable of claim 1, wherein the width of the intermediate segment is in a range from three times the interlock height to five times the interlock height.

11. The armored cable of claim 1, wherein any of the maximum pull resistance, the minimum pull resistance, the average pull resistance, and the standard deviation of the pull resistance is reduced when pulled through an aluminum stud wall, compared to an otherwise identical armored cable comprising a cable sheath having a cross-sectional profile with a maximum angle of incidence greater than 45° at a pull speed in a range from about 10 feet per minute to about 50 feet per minute in a forward direction.

12. The armored cable of claim 1, wherein any of the maximum pull resistance, the minimum pull resistance, the average pull resistance, and the standard deviation of the pull resistance is reduced when pulled through an aluminum stud wall, compared to an otherwise identical armored cable comprising a cable sheath having a cross-sectional profile with a maximum angle of incidence greater than about 45° at a pull speed in a range from about 10 feet per minute to about 50 feet per minute in a reverse direction.

13. The armored cable of claim 1, wherein a crush resistance of the armored cable is 1000 lbf or greater.

14. The armored cable of claim 1, wherein the armored cable meets or exceeds the UL 1569 requirements for crush resistance.

15. The armored cable of claim 1, wherein the armored cable meets or exceeds the UL requirements for pull force prior to failure.

16. An armored cable comprising:

a cable sheath surrounding a conductor core, and having a cross-sectional profile comprising:

an interlock receiver extending from a first end of the cross-sectional profile to an innermost point of the cross-sectional profile;

an interlock protrusion extending from a second end of the cross-sectional profile to an outermost point of the cross-sectional profile; and an intermediate segment extending from the innermost point of the cross-sectional profile to the outermost point of the cross-sectional profile;

wherein:

a maximum angle of incline of the intermediate segment is less than 20°; and a width of the intermediate segment is in a range from two to ten times the interlock height wherein the cable sheath comprises a metal ribbon wrapped helically such that the interlock protrusion of a first convolution of the metal ribbon is secured within the interlock receiver of a second convolution of the metal ribbon, to form a plurality of interlocking convolutions; and wherein any of the maximum pull resistance, the minimum pull resistance, the average pull resistance, and the standard deviation of the pull resistance is reduced when pulled through an aluminum stud wall, compared to an otherwise identical armored cable comprising a cable sheath having a cross-sectional profile with a maximum angle of incidence greater than 45° at a pull speed in a range from about 10 feet per minute to about 50 feet per minute in a forward direction.

17. An armored cable comprising:

a cable sheath surrounding a conductor core, and having a cross-sectional profile comprising:

an interlock receiver extending from a first end of the cross-sectional profile to an innermost point of the cross-sectional profile;

an interlock protrusion extending from a second end of the cross-sectional profile to an outermost point of the cross-sectional profile; and an intermediate segment extending from the innermost point of the cross-sectional profile to the outermost point of the cross-sectional profile;

wherein:

a maximum angle of incline of the intermediate segment is less than 20°; and a width of the intermediate segment is in a range from two to ten times the interlock height wherein the cable sheath comprises a metal ribbon wrapped helically such that the interlock protrusion of a first convolution of the metal ribbon is secured within the interlock receiver of a second convolution of the metal ribbon, to form a plurality of interlocking convolutions; and wherein any of the maximum pull resistance, the minimum pull resistance, the average pull resistance, and the standard deviation of the pull resistance is reduced when pulled through an aluminum stud wall, compared to an otherwise identical armored cable comprising a cable sheath having a cross-sectional profile with a maximum angle of incidence greater than 45° at a pull speed in a range from about 10 feet per minute to about 50 feet per minute in a reverse direction.

* * * * *